United States Patent
Llewellyn et al.

(10) Patent No.: US 6,871,081 B1
(45) Date of Patent: Mar. 22, 2005

(54) BROADBAND WIRELESS ACCESS SYSTEM

(75) Inventors: Ian Llewellyn, Harlow (GB); Mark W Tait, Herts (GB); Simon Gale, Herts (GB); Michael F Grant, Herts (GB)

(73) Assignee: Nortel Networks Limited, St. Laurent (CA)

( * ) Notice: Subject to any disclaimer, the term of this patent is extended or adjusted under 35 U.S.C. 154(b) by 579 days.

(21) Appl. No.: 09/693,128

(22) Filed: Oct. 20, 2000

(51) Int. Cl.$^7$ .............................................. H04M 1/00
(52) U.S. Cl. .................... 455/561; 455/16; 455/60; 455/20; 455/19; 455/444; 455/15; 455/559; 455/554.2; 455/555; 455/105; 455/426.2; 370/95.2; 343/770
(58) Field of Search .............................. 455/16, 60, 20, 455/19, 444, 15, 559, 554.2, 555, 105, 462.2; 370/95.2; 343/720

(56) References Cited

U.S. PATENT DOCUMENTS

| | | | | |
|---|---|---|---|---|
| 5,461,627 A | * | 10/1995 | Rypinski | 370/346 |
| 5,890,055 A | * | 3/1999 | Chu et al. | 455/16 |
| 6,480,163 B1 | * | 11/2002 | Knop et al. | 343/770 |

* cited by examiner

Primary Examiner—David Hudspeth
Assistant Examiner—David Nguyen
(74) Attorney, Agent, or Firm—Barnes & Thornburg LLP

(57) ABSTRACT

Typically it is expensive to add cable within an existing multiple dwelling units (MDUs) such as blocks of flats to provide additional services such as broadband internet access, video on demand and video telephony. The present invention provides a broadband wireless access system especially suited to MDUs. A base station modulates radio frequency carrier signals with data to be transmitted in the system, and these signals are directed along a distribution network to a plurality of antennas which provide WLANs for subscriber equipment within the MDU.

8 Claims, 5 Drawing Sheets

BROADBAND WIRELESS ACCESS SYSTEM

FIELD OF THE INVENTION

The present invention relates to broadband wireless network provision, and in particular though not exclusively to a low cost broadband distributed multiple wireless local area network (WLAN) communications system for multiple dwelling units.

BACKGROUND OF THE INVENTION

There is increasing demand for broadband services such as video on demand, fast internet access and video telephony to the home, and in particular the possibility of getting wide bandwidth public packet switched networks into domestic residential dwellings. A number of methods of doing this are available including asymmetric digital subscriber line (ADSL) over existing copper telephone cables, broadband wireless access (BWA), coaxial links by cable TV operators for example and optical fibre to the home. However, as well as the broadband cable connection to the house, all of these methods require extensive cabling inside the dwelling in order to get the data to a computer or other data devices which require it. This problem is exacerbated in multiple dwelling units (MDUs) such as blocks of flats where over 50% of the world's population lives.

Wireless local area networks (WLAN) are a known method for providing wireless connection between various nodes such as personal computers within an office environment. One personal computer of the proposed WLAN is allocated as a base station for the network and is connected by cabling to an interface with one or more external networks such as a wide area network within the office building or company Intranet for example. The base station PC is configured to communicate with other PC's in the WLAN using a common radio frequency carrier. The carrier is used to transmit data between the base station PC and one of the other PC's in the WLAN one at a time, such that the allocated PC is able to use the full bandwidth of the carrier to communicate with the base station PC. This is a convenient arrangement as data communications between PC's tend to be intermittent or bursty by nature. Each of the PC's request a communications channel with the base station PC as required, and the base station PC allocates this resource to the various other PC's normally on a first come first served basis, although various protocols can be used. The wireless communication resource can also be shared between a number of computers using time division multiplexing for example. Various WLAN protocols exist, including for example IEEE802.11; IEEE8.02.11a; IEEE802.11b; HOMERF; and HIPERLAN. Details of these can be found at:

| | |
|---|---|
| http://grouper.ieee.org/groups/802/11/ | for 802.11 |
| http://www.bluetooth.com/ | for Bluetooth |
| http://www.homerf.org/ | for HomeRF |
| http://www.etsi.org/ | for HiperLAN | which are hereby incorporated by reference. As the radio frequency spectrum is a scarce resource, and has been restricted for WLAN use, a wireless communications channel bandwidth of typically 11 MHz is available for use by all the PC's in a WLAN. This is increasingly restrictive with the increasing use of broadband services such as fast Internet access and video telephony. While WLAN's can be used to provide broadband services within MDU's such as blocks of flats or commercial office blocks for example, the WLAN's are typically restricted to a single residence or perhaps a floor of an office block and each requires separate cabling into the building to the base station PC. There are also interference difficulties arising between adjacent WLAN's. This solution therefore does not overcome the difficulties mentioned above. What is required is an improved broadband wireless communications system, particularly for MDU's.

SUMMARY OF THE INVENTION

An object of the present invention is to provide an improved or at least alternative broadband wireless access communications system for one or more residential or commercial dwellings. It is a further object of the present invention to provide improved broadband wireless provision for multiple dwelling units (MDUs).

In a first aspect the present invention provides a wireless communications system for communicating data between high density subscriber equipment and an external network, the system comprising a base station connectable to said external network; a distribution network coupled to the base station; and a plurality of antennas coupled to the distribution network, each antenna providing a wireless connection for one or more proximate subscriber equipment to the distribution network; wherein said data is communicated between the base station and subscriber equipment by modulating a radio frequency carrier signal.

Preferably each said wireless connection is a wireless local area network (WLAN).

Preferably said data is communicated by modulating multiple radio frequency carrier signals, only one of said signals being used in each WLAN.

Preferably a common modulated radio frequency carrier signal is used in the distribution network and a said WLAN to communicate said data between a said subscriber equipment and the base station.

Preferably a said radio frequency carrier signal for a said WLAN is frequency multiplexed onto the distribution network.

Preferably antennas providing WLANs having common carrier frequencies are spaced apart to minimise co-frequency interference.

Preferably antennas providing WLANs having common carrier frequencies are physically separated by at least one antenna providing a wireless link having a different carrier frequency.

Preferably the distribution network is a predetermined radio frequency signal pathway between the base station and the antennas for the modulated radio frequency carrier signal.

Preferably the signal pathway is a coaxial cable.

In a second aspect the present invention provides a method of operating a wireless communications system for communicating data between high density subscriber equipment and an external network, the system comprising a distribution network coupled to a plurality of antennas; the method comprising: communicating data between the subscriber equipment and the external network by modulating a radio frequency carrier signal to provide a wireless connection between a said antenna and one or more proximate subscriber equipment.

Preferably the distribution network provides a radio frequency signal pathway for the modulated radio frequency carrier signal.

In a third aspect the present invention provides a wireless communications system for connecting high density subscriber equipment to an external network; the system comprising: a base station coupled to a plurality of wireless networks by a distribution network, each wireless network connectable to a number of said subscriber equipment; wherein the base station communicates with the wireless networks using modulated radio frequency carrier signals.

Preferably the same modulated radio frequency signal is used in the distribution network and within a said wireless network to couple a said subscriber equipment to the base station.

In a fourth aspect the present invention provides a coaxial cable distribution system for connecting to a plurality of antennas, the system comprising a coaxial cable having a number of coaxial stubs tapped-off therefrom, each tapped-off coaxial stub having means for frequency selectively connecting a said antenna to said system.

Preferably said frequency selective means comprises a band pass filter.

Preferably comprising a number of impedance matching transformers incorporated adjacent said tap-offs and arranged to change the impedance of the coaxial cable in order to optimise power transfer between the coaxial cable and each coaxial stub.

In a fifth aspect the present invention provides a method for connecting to a plurality of antennas comprising: providing a coaxial cable distribution system having a coaxial cable with a number of coaxial stubs tapped-off therefrom, wherein each tapped-off coaxial stub has means for frequency selectively connecting to one of the antennas.

In a sixth aspect the present invention provides an impedance matching transformer for a coaxial cable comprising means for changing the diameter of the outer conductor on said cable in order to change the impedance of said cable.

Preferably said means comprises a clamp arranged about said cable and operated to reduce the diameter of said outer conductor. Preferably said means comprises two clamps arranged about said cable and operated to stretch a section of cable between said clamps.

In a seventh aspect the present invention provides a method of implementing an impedance matching transformer in a coaxial cable, the method comprising changing the diameter of the outer conductor of said cable in order to change the impedance of said cable.

In an eighth aspect the present invention provides a coaxial cable tap-off point for connecting a first coaxial cable to an end of a second coaxial cable, the arrangement comprising: a groundplane extending longitudinally about the outer conductor of said first cable and electrically connected at its distal ends to said outer conductor, said outer conductor having two longitudinally spaced apart circumferential discontinuities located between said connections which expose the inner conductor of said cable; an antenna element extending longitudinally about said discontinuities, said inner conductor being located between the antenna element and the groundplane; wherein said groundplane is connectable to the outer conductor of said second coaxial cable, and the antenna element is connectable the inner conductor of said second cable.

Preferably said groundplane is a cylindrical collar arranged coaxially about said first cable and wherein said antenna element is located within said collar.

BRIEF DESCRIPTION OF THE DRAWINGS

The present invention will now be described with reference to the following drawings, by way of example only and without intending to be limiting, in which:

FIG. 4b shows a section view of the tap-off arrangement of FIG. 4a;

FIG. 5b shows a section view of the preferred antenna arrangement of FIG. 5a.

DETAILED DESCRIPTION

The present invention avoids the prior art problem of extensive cabling within a dwelling or multiple dwelling unit (MDU) by providing a communications system comprising a plurality of broadband wireless local area networks (WLAN) from a supply connection to the outside of a property to customer equipment inside this property. A distribution system or network connects the various WLAN's to a centralised unit or base station of the communications system. The system utilises a number of radio frequency carrier signals or frequency bands within the available WLAN frequency spectrum mentioned above.

Figure 1:
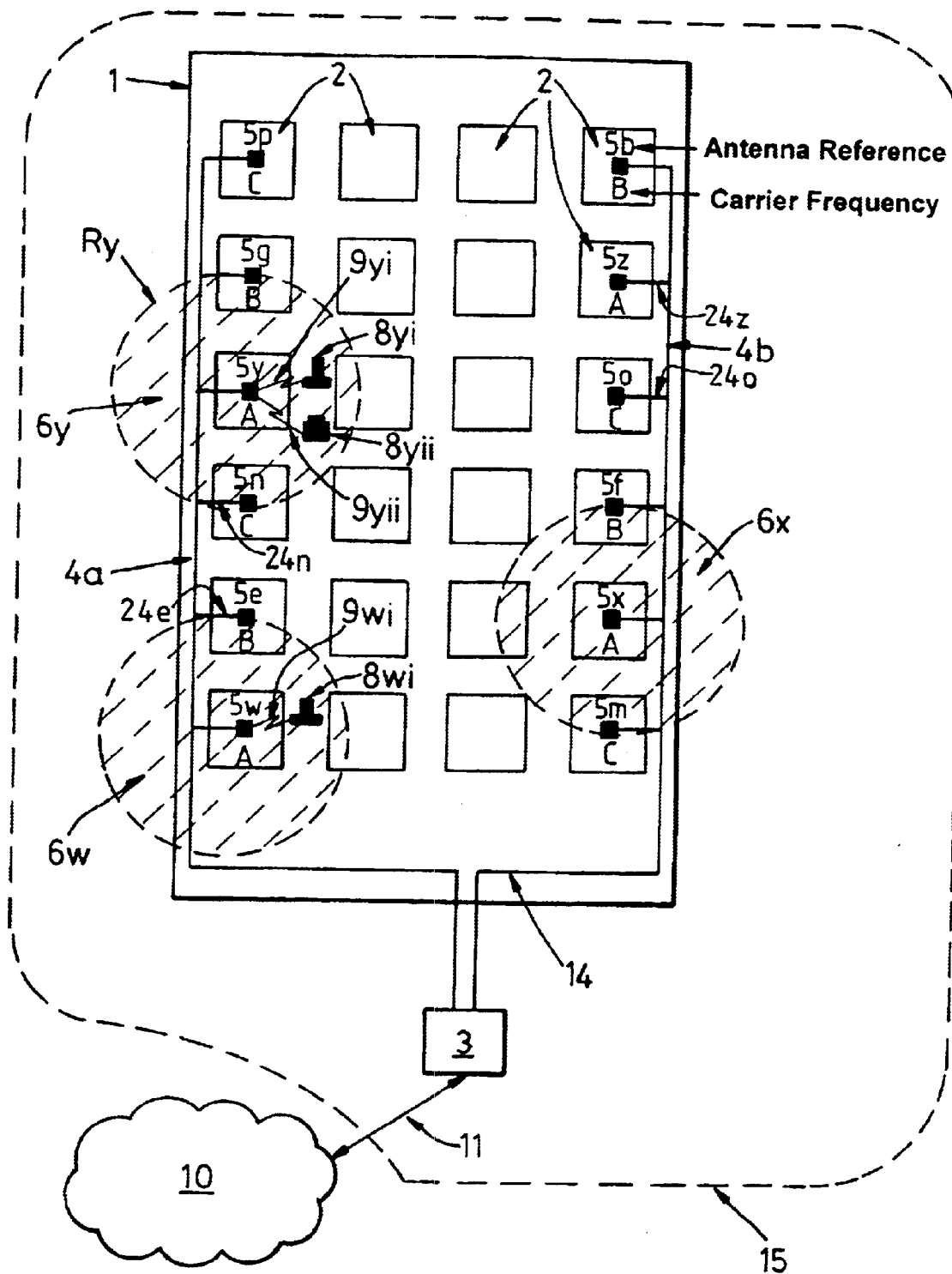
FIG. 1 is a schematic diagram of a broadband wireless access communications system for multiple dwelling units.

Referring to FIG. 1 a preferred embodiment broadband access communications system 15 comprises: a base station 3 which interfaces with a link 11 to a core network 10; a distribution network 14 comprising one or more coaxial cables 4a and 4b; and a plurality of antennas 5w, 5e, 5n, 5y, 5g, 5p, 5b, 5z, 5o, 5f, 5x, 5m, each providing a broadband WLAN 6w, 6e, 6n, 6y, 6g, 6p, 6b, 6z, 6o, 6f, 6x, 6m, to part of an MDU 1.

The connection link or edge node 11 to the core or transport network 10 is provided at a location adjacent or inside the MDU, for example in an external enclosure or a basement control room. The connection link 11 could be an optical fibre, high bandwidth cable link, or a wireless link in a BWA network from one of the core network's base stations to the communications system 15 shown in FIG. 1.

The core network 10 is a broadband packet switched network which provides for example access to the internet, PSTN or other networks, user databases, access software, video on demand, video telephony, voice only telephony and similar services. While the communications system 15 is most suited to MDUs, it is also applicable to high density housing and commercial buildings such as shopping malls, office blocks or industrial factories for example.

Preferably the coaxial cable(s) 4 and the antennas 5 are mounted on the outside of the property or MDU 1 so that no internal access to the property is required to install the system 15. Depending on the size of the building, one or more coaxial cables 4 are used to supply a plurality of antennas 5. Each antenna taps off a rising coaxial cable 4 as described further below. Preferably the antennas 5 are mounted on windows 2 of the MDU 1 to minimise signal path loss between the antenna and customer equipment 8 within the building which forms part of the WLAN 6 associated with each antenna 5. An existing coaxial distribution system (for example for broadband or cable television distribution) may be used instead of installing new coaxial feeders 4.

Antennas 5 are tapped-off at points along the rising coaxial cable(s) to provide coverage on different floors of the building 1. Alternatively other distribution networks may be utilised such as twisted pair cabling, multi core cables, optical fibre or even wireless links to the antennas 5, however these may require additional equipment and hence cost and the preferred method is to utilise one or more rising coaxial cables 4 each serving a plurality of antennas 5. While it is preferred to mount the rising cable 4 externally, internal distribution could alternatively be used where the distribution network 14 and antennas 5 are installed in an internal service duct within the MDU 1 for example.

In each case the distribution network 14 carries one or more radio frequency carrier signals each modulated with data (possibly including voice over data packets) from the core network 10 to the customer equipment 8, and vice versa. As the radio spectrum is a precious and limited resource, only a limited number of sufficiency wide frequency bands are available for these modulated carriers to provide broadband wireless connection services. The base station 3 provides for the interface between the broadband wireless system 15 and the core network 10. In practise this is implemented by either a multiplexing unit or other high bandwidth switch. The base station 3 is preferably implemented on a personal computer (PC), into which standard printed circuit boards (PCB) implementing this interface can be added. The base station 3 also generates the above, mentioned radio frequency carriers to be fed into the distribution network 14. This function can also be implemented using standard radio cards which are slotted into the PC 3. The centralised unit or base station 3 maps incoming data from the core network 10 onto the radio frequency carrier signals by modulating the generated radio frequency carrier signals which are then distributed along the distribution network 14 to the WLANs 6. Similarly data arriving from the distribution network 14 is retrieved by demodulating the radio frequency carrier signals transmitted by subscriber equipment 8 in the WLANs 6 and transmitting this to the core network 10.

As already discussed, only a limited number of radio frequency carriers are available for in-building broadband wireless connections. For example a limited section of the radio frequency spectrum has been reserved worldwide by regulators for wireless LAN applications at 5 GHz (IEEE802.11a—North America or Hiperlan—Europe) or 2.5 GHz (IEEE802.11b, Home RF or Bluetooth standard). The applicability of WLAN to MDUs is therefore limited without a method of distributing this limited bandwidth capability to service a large number of broadband and high density users as is the case in MDUs.

In order to get sufficiently high coverage in urban areas, and in particular MDUs, an efficient frequency reuse scheme is described below with respect to FIG. 1. The invention provides a method and apparatus for frequency selective tapoffs from the distribution network 14 to the antenna's 5. The network 14 and antennas 5 which each provide a WLAN 6 are arranged such that each antenna 5 operates with one of the radio frequency carriers, and is further arranged such that antennas 5 operating on the same carrier frequency are physically spaced apart to minimise co-frequency interference.

A number of existing WLAN systems can be utilised to implement the invention, for example IEEE802.11, HomeRF and Hiperlan; although it is preferred to use IEEE802.11a or b since they use distinct frequencies and have high bandwidth capacities. In each case the amount of bandwidth available for a wireless LAN (WLAN) is limited, particularly in the case of broadband WLAN systems. For example, a 802.11b broadband WLAN system will typically be limited to a maximum of 3 independent carrier frequencies A, B, or C each of which has a maximum channel bandwidth of 11 MHz.

Because of the problem of limited capacity due to the small number of carrier frequencies available, these carrier frequencies A, B and C are reused throughout a large property 1 comprising many customers such as in an MDU 1 as shown in FIG. 1. Where there is more than one rising coaxial cable 4 in the distribution network 14, broadband network capacity can be provided whilst still maintaining acceptably low interference between subscriber equipment 8 utilising common carrier frequencies by careful frequency planning. This is achieved by maximising the distance between common carrier frequency antennas 5 connected to different coaxial cables 4 as well as limiting the output power of the antennas 5 and subscriber equipment 8 of each WLAN 6 to limit the coverage area of each antenna 5 such that it does not significantly overlap the coverage area of another WLAN 6 having the same carrier frequency.

In embodiments incorporating time division multiplexing within the carrier frequencies, frequency planning or maintaining a spaced apart relation between common carrier frequency antennas is also required on common carrier frequency antennas connected to the same rising coaxial cable 4. For example in FIG. 1, antenna 5$w$ broadcasts and receives data on carrier frequency A and interfaces with subscriber equipment 8$w$ using notional wireless links 9 on the same carrier frequency (A) to form a WLAN 6$w$. The WLAN 6$w$ has a coverage area Rw which extends out from the antenna 5$w$ in a distribution pattern which is dependent upon the antenna type used. However for illustration purposes a spherical distribution pattern will be assumed. Antenna 5$x$ also utilises carrier frequency A and its WLAN 6$x$ has a coverage area or volume Rx. Antenna 5$x$ is located on the floor above antenna 5$w$ and is also on the far side of the building 1 compared with antenna 5$w$. By limiting the power output associated with each antenna 5$x$ and 5$w$, the coverage area Rx and Rw of each can be limited such that these do not overlap and therefore reduces or eliminates interference between these two WLANs 6$x$ and 6$w$. Similarly, antenna 5$y$ is located on a different floor from antennas 5$w$ and 5$x$, being three floors above antenna 5$w$ and on the same side of the building and on the floor above antenna 5$y$ but on the far side of the building. It can be seen from the dashed lines of FIG. 1 which represent the various coverage areas Rw–z that there is no significant overlap of coverage area and hence reduced or no co-frequency interference. The use of repeated carrier frequencies over the communications system 15 allows for increased capacity of the network as a whole to the end users or subscriber equipment 8 thus enabling the provision of broadband services such as video telephony, video on demand and high bandwidth Internet usage to each subscriber.

While two rising coaxial cables 4$a$ and 4$b$ have been shown, other arrangements can also be used including a single rising coaxial cable 4 or multiple rising coaxial cables dependent on the size of the property 1. Each cable 4 is capable of carrying a number of carrier frequencies. Similarly twisted pair, multiple core cables, optical fibres or wireless links could alternatively be used to feed the antennas 5.

Each subscriber of the communications system 15 is associated with one of the antennas 5 which interacts with various equipment 8 within the subscribers premises utilising the carrier frequency assigned to the particular antenna. Using the preferred IEEE802.11b standard each subscriber has access to 11 MHz of bandwidth using the assigned radio frequency carrier. In a property 1 where more than one antenna is assigned a particular radio frequency carrier, the entire bandwidth of the radio frequency carrier can be assigned to one of the subscribers at a time; alternatively this bandwidth can be shared by using time division multiplexing on the common radio frequency carrier. In the preferred arrangement, any subscriber equipment 8 requesting access to the core network 10 "listens" to determine whether it's allocated carrier frequency is being used, and if not starts it broadcast. If the carrier frequency is in use, then the subscriber equipment waits for a predetermined or random time before again determining whether the carrier frequency is available. Similarly if the base station 3 is required to transfer incoming information from the core network to a particular subscriber equipment, it is confined to first determine whether the appropriate carrier frequency is in use, and if not broadcast the information along the distribution network 14 to the appropriate subscriber equipment 8.

The radio interface works on a clear to send (ACK) and a ready to send basis (NAK), so that the transmitter can be sure that the receiver isn't being interfered with by another user. The data is sent in frames with error checking and every frame is acknowledged. If the transmitting base station 3 or subscriber equipment 8 does not get an acknowledgement, it resends the frame. This is done from the MAC/PHY layers so that to higher layers in the communications model this is all transparent. More details on the preferred mode of operation can be found in the IEEE802.11b standards on wireless LAN protocols.

Incoming data from the core network 10 for example IP packets are addressed to a particular subscriber equipment 8 in the communications system 15 dependent upon the destination address in the IP packets. The centralised unit 3 effectively maps incoming IP packets onto the radio frequency carrier signal associated with the IP address of the subscriber equipment 8 by modulating it according to the IEEE802.11b protocol for example. Each subscriber is associated with one of the antennas 5 of the communications system 15, and may have a number of subscriber equipment 8 such as personal computers, video phones, or set top boxes, each of which have a wireless link 9 to the antenna 5. A particular radio frequency carrier may therefore service a number of subscribers each having a plurality of subscriber equipment.

In its first aspect then, the present invention provides a wireless access system comprising multiple WLANs 6 coupled to a single base station 3 by a distribution network 14, preferably coaxial cable. This avoids the need for expensive cabling to extend within an MDU, instead providing a broadband wireless link for "the last 10 yards" to user equipment 8.

Figure 2:
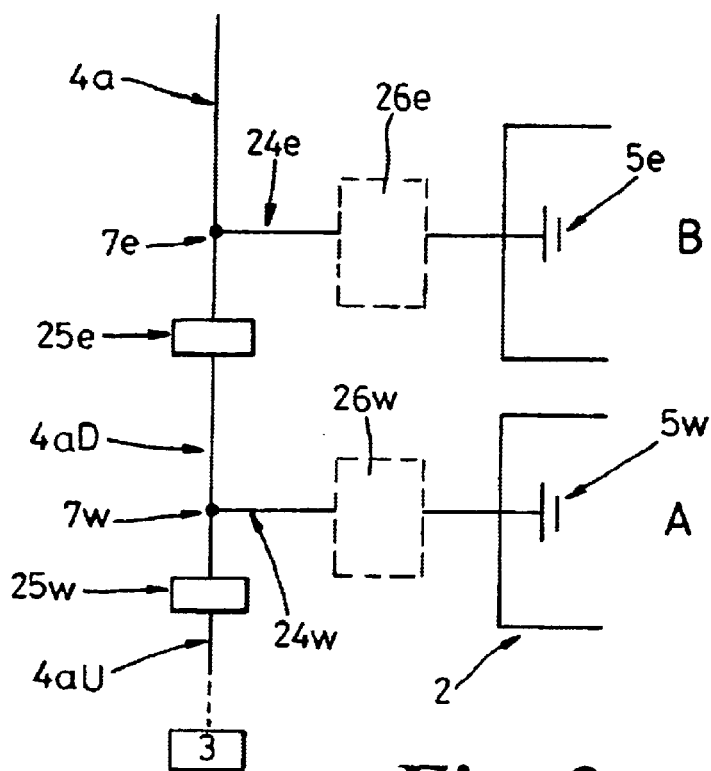
FIG. 2 is a more detailed schematic showing a section of the communications system of FIG. 1 in which coaxial cable supplies a plurality of antennas.

Referring to FIGS. 1 and 2 a rising coaxial cable (for example 4a) is used to supply or feed a plurality of antennas 5 allocated different carries frequencies. Each antenna 5w, 5e, 5a, 5y, 5g and 5p taps off from the rising coaxial cable 4a using a spur coaxial cable 24. Each tap-off arrangement is frequency selective such that each antenna 5 operates using only one carrier frequency to avoid interference from adjacent antennas 5. Antennas 5 using the same carrier frequency are spaced apart such that physically they will be separated by an antenna 5 using a different carrier frequency in order to sufficiently separate the wireless signals associated with each corresponding WLAN.

In the example shown in FIG. 2, a tap-off arrangement comprises a spur coaxial cable 24 which taps off from rising coaxial cable 4a at a tap-off point referenced as 7 to feed an antenna 5. Each tap off arrangement also comprises a frequency selective filter 26 to each antenna 5 which enables only one carrier frequency (A or B or C) to be received or transmitted from that antenna. The filter 26 may be implemented as part of the tap-off point 7 or as part of the antenna 5 or alternatively as a separate unit. This allows the frequency reuse structure of FIG. 1 to be built up using different filters 26 for antennas which are located adjacent each other. For buildings with large capacity requirements multiple rising coaxial cables 4 are used, and by deploying the cables with appropriate spacing around the building, and attaching antennas with radio frequency filters 26 in the correct pattern, a three dimensional frequency reuse pattern can be built up to minimise interference from adjacent antennas.

In the example of FIG. 2, filter 26w passes carrier frequency A while filtering out carrier frequencies B and C. Filter 26e passes carrier frequency B to antenna 5e while filtering out carrier frequencies A and C. Antennas 5w and 5e are on adjacent floors and their WLAN coverage area Rw and Re will overlap to some extent, however because they are each utilising different carrier frequencies (A and B), there is no interference between these two adjacent antennas.

Power amplifiers (not shown) may be located adjacent to each antenna 5 to amplify signals from the antenna 5 to the centralised unit 3, particularly where long cable lengths between the two are involved. These amplifiers are preferably powered by utilising a DC power feed along the coaxial cable. In fact amplifiers can be installed for both the up and down links and must be arranged to switch on and off dependent on the signal direction, the amplifier being used to amplify signals in the uplink (toward the centralised unit) direction must be switched off during downlink (toward the antenna) communications. There are a number of ways of achieving this result, for example by means of a low frequency RF carrier, generated by the centralised unit 3 and being detected at the antenna amplifiers and used to switch on or off the amplifiers.

As described above the distribution network 14 is preferably implemented using one or more rising coaxial cables 4, which supply a plurality of antennas 5. Clipping multiple antennas onto a coaxial cable is not currently used because this produces a low transfer of power to the antennas as the impedance of the antenna and spur 24 is in parallel to that of the coaxial cable in the downlink direction (away from the centralised unit 3) and so an impedance mismatch will occur in the connection with the uplink coaxial cable at the point of connection or tap-off 7. This results in reflection of a portion of the available power at the antenna tap-off point back to the base station 3. To counter this impedance matching transformers 25 are positioned immediately prior to each tap-off point 7 of the rising coaxial cable 4 to minimise this return loss.

Referring to FIG. 2, the coaxial cables 4 and 24 each have a nominal impedance of 50 ohms, each of the coaxial cable sections about the tap-off 7w; the coaxial riser cable section in the downlink direction 4aD, the coaxial riser cable section in the uplink direction 4aU, and the coaxial stub section 24w have an impedance of 50 ohms. Looking in the downlink direction from the base station 3 to the antenna 5w, the coaxial stub 24 and the downlink section of the coaxial riser 4aD are seen in parallel, their combined impedance being 25 ohms. There is therefore an impedance mismatch between the uplink section of the rising coaxial cable 4aU of 50 ohms and the downlink section of coaxial riser cable 4aD in parallel with the coaxial stub 24w of 25 ohms. An impedance matching transformer 25 is therefore required on the uplink section of the rising coaxial cable 4aU to transform the impedance of this section 4aU to 25 ohms to eliminate signal reflection back to the centralised unit 3 at the tap-off point 7. A similar impedance matching transformer 25 is used at each tap-off point 7 associated with an antenna 5 to eliminate signal reflections at these tap-off points. The impedance transformers eliminate or minimise signal reflections in both uplink and downlink signal directions. This arrangement ensures that any signal power loss up the distribution network 14 is due mainly to cable loss and not signal reflection.

Conventionally, impedance matching can be achieved by using a quarter wavelength long waveguide section whose impedance is the geometric mean of the two impedances to be matched ($\sqrt{(50 \times 25)} = 35.3$ ohm in the above example). Such impedance matching transformers are well known, however these transformers require cutting the rising coaxial cable 4 and connecting the two resulting cable ends into the transformer. This requirement complicates the distribution network 14 installation, and the invention provides alternative impedance matching transformers 25 described below which do not require cutting of the coaxial cable riser 4a.

The power division at each antenna tap-off 7 can also be adjusted to equalise the power received by or from each antenna 5 by altering the antenna 5 impedance and/or the rising coaxial cable 4 impedance immediately prior to the tap-off point by adjusting the corresponding impedance matching transformer 25. Normally the power transferred to the antennas will fall as more antennas are tapped off between any given antenna and the base station 3. By adjusting each antenna impedance (for example 5w, 5e, 5n, 5y, 5g and 5p) and/or each corresponding impedance transforming unit (25w, 25e, 25n, 25y, 25g and 25p respectively), the power transmitted to each antenna (5w, 5e, 5n, 5y, 5g and 5p) in the distribution network 14 (or at least one coaxial riser cable 4a subnetwork) can be equalised and any power loss in the cable 4a, due to absorption or due to the other tapped-off antennas can be compensated for (by utilising the above described RF power amplifiers for example). Adjustment of an antenna 5 impedance can be implemented using an additional impedance matching transformer (not shown) between the tap-off point 7 and the antenna 5. The desired power distribution is achieved by adjusting the various impedance matching transformers 25 in a manner that will be known to those skilled in the art.

Figure 3A:
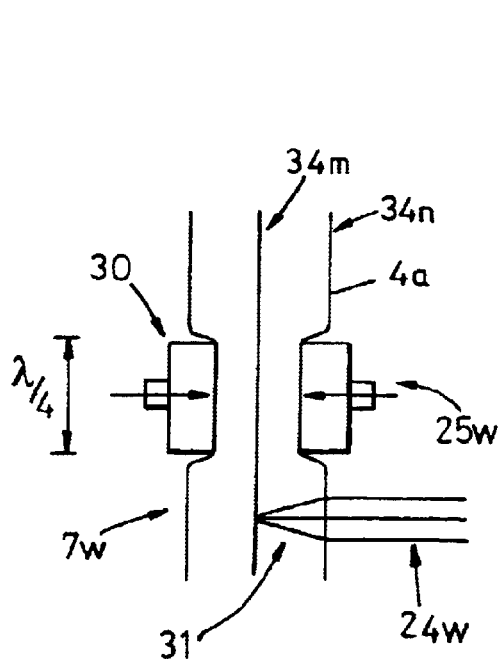
FIG. 3a shows a first preferred method of implementing an impedance matching transformer for the coaxial cable of FIG. 2.

FIG. 3a shows a preferred embodiment of an impedance matching transformer 25 according to the invention which is implemented by reducing the diameter of the coaxial cable outer braiding to provide the required impedance matching. Impedance matching transformer 25 comprises a clamp 30 arranged about a section of the rising coaxial cable 4 immediately prior to the tapoff point 7 where a coaxial stub 24 which is connected to an antenna 5 intersects the rising coaxial cable 4. The following equation describes the impedance of a coaxial cable where n is the intrinsic impedance of the dielectric material (for example for an air spaced coaxial line is 37 ohms), a is the radius of the inner conductor 34m and b is the radius of the outer conductor 34n:

$$Z = \frac{\eta}{2\pi} \ln \frac{b}{a}$$

A coaxial cable has a soft dielectric spacer, for example a silicon rubber so that the clamp 30 can compress the coaxial cable 4a reducing the diameter of the braiding or outer conductor 34n. This compression reduces the impedance of the coaxial cable so that in the above described distribution network 14 the impedance of the uplink section coaxial cable 4aU can be reduced to match that of the coaxial stub 24 plus antenna 5 in parallel with the downlink section of coaxial riser cable 4aD. For example if the power is split equally between an antenna 5 and the downlink section of cable 4aD both must have the same impedance for example 50 Ohms. This means that their combined impedance is 25 Ohms. To match the impedance of 25 Ohms to the uplink section 4aU of rising coaxial cable 4a of 50 Ohms, section of the uplink coaxial cable 4aU must have its impedance reduced to $Z'=\sqrt{25 \times 50}$ i.e. 35.3 Ohms.

The required reduction in the outer conductor's radius is given by:

$b'/b = e^{\pi \cdot (Z'-Z)/\eta}$

Where b' is the required reduced outer conductor's radius, and Z' is the required impedance (in this case 35.3 ohms) and b is the original outer radius and Z the impedance of the cable. A quarter wavelength section of cable is used as the reflections from discontinuities from each end of the reduced radius outer conductor 34n section cancel out at this length.

The power at each antenna tap-off point 7 can be varied to compensate for power loss along the length of the coaxial riser cable 4a, so that for example more signal power is transferred to the antenna at the end of the cable 4a run than the antenna closest to the centralised unit 3 to compensate for power absorption in the cable which increases with the distance from the centralised unit 3. The amount of power distributed to the antennas 5 is the ratio of the cable impedance and the antenna impedance. For example a 100 ohm antenna 5 connected to a 50 ohm coaxial riser cable 4a will have one third of the power signal on the coaxial riser cable transferred to it. It will therefore require an impedance matching transformer that converts the 50 ohm uplink cable section 4aU to the 33 ohm impedance of the antenna and downlink cable section 4aD in parallel to achieve this. Hence the amount of impedance matching of the cable 4a will vary depending on the power transfer requirements of each antenna, as would be understood by those skilled in the art. As discussed above the antenna impedance can be varied using additional impedance matching transformers (not shown) connected to the coaxial stub 24 associated with the antenna 5.

Figure 3B:
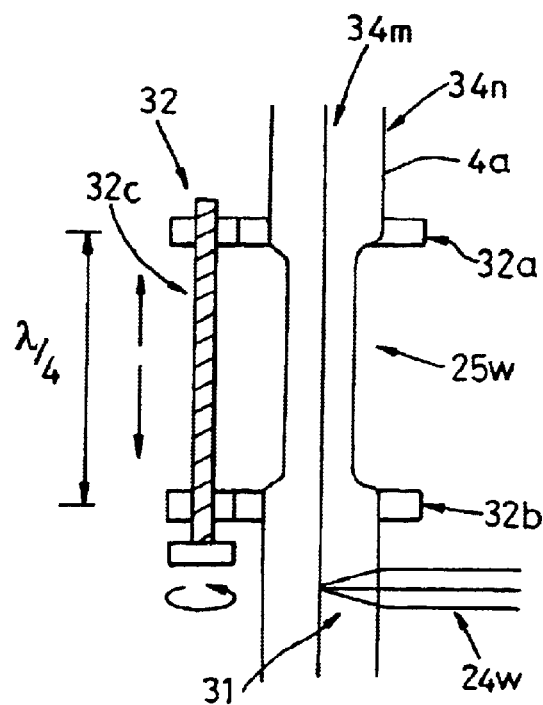
FIG. 3b shows a second preferred method of implementing impedance matching transformer for the coaxial cable of FIG. 2.

FIG. 3b shows an alternative embodiment impedance matching transformer 25 in which the diameter of the outer conductor of the coaxial cable 4 is reduced by stretching the cable 4. An expansion clamping arrangement 32 is used to stretch a section of the rising coaxial cable 4 immediately prior to the antenna tap off point 7. The stretching arrangement 32 comprises two clamps 32a and 32b arranged about separated sections of the rising coaxial cable 4 and a bolt 32c which is rotatably secured to each clamp such that rotating the bolt 32c varies the distance between the two clamps 32a and 32b. Assuming the volume of coaxial cable 4 between the two clamps 32a and 32b is constant, the amount of cable stretching required is given as follows. The initial volume is given by:

$V = \pi b^2 I$

The final volume is given by:

$V = \pi b'^2 I'$

The initial length I of cable must be stretched to finish up a quarter of a wavelength long to avoid discontinuity reflections, so that the initial length of cable 4 is given by: $I=(b'/b)^2 l'$, where I' is a quarter wavelength.

A spike 31 in the coaxial stub 24 may be used as the tap off point 7 for connecting the antenna 5 to the inner 34m and outer 34n conductors of the coaxial cable 4a as is known in the art. Various other prior art methods for connecting one coaxial cable 24 to another coaxial cable 4 are also known.

Figure 4A:
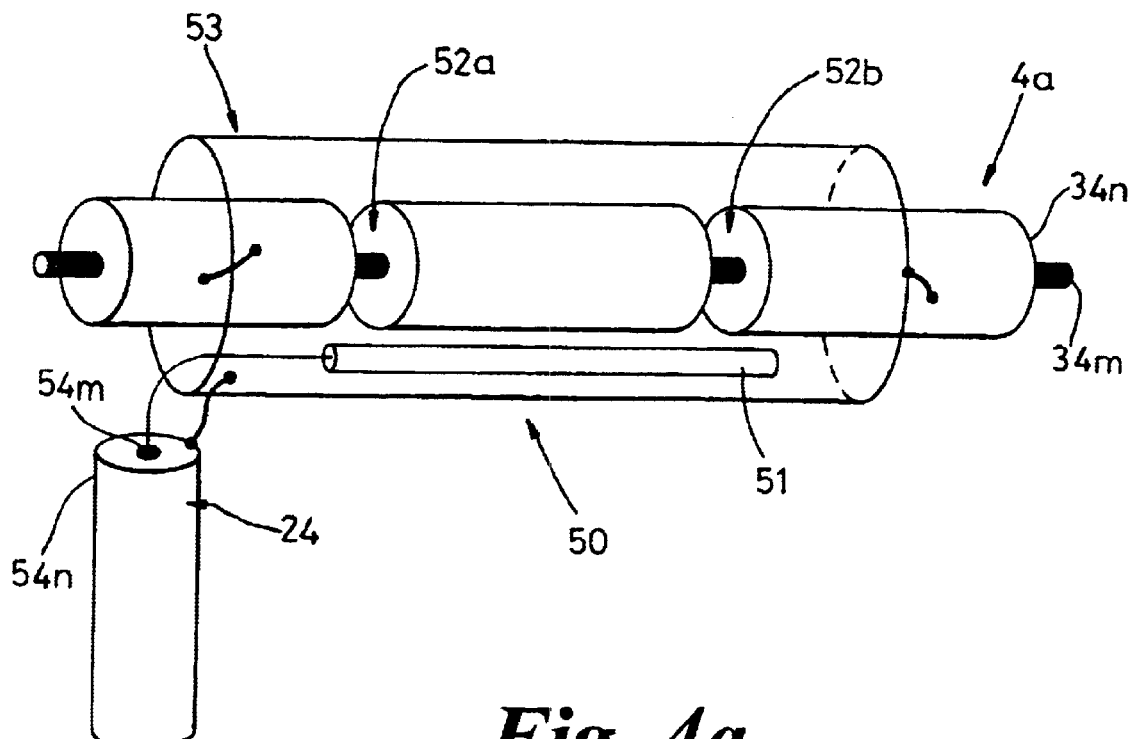
FIG. 4a shows a detailed view of a preferred tap-off arrangement from the coaxial cable of FIG. 2.
Figure 4B:
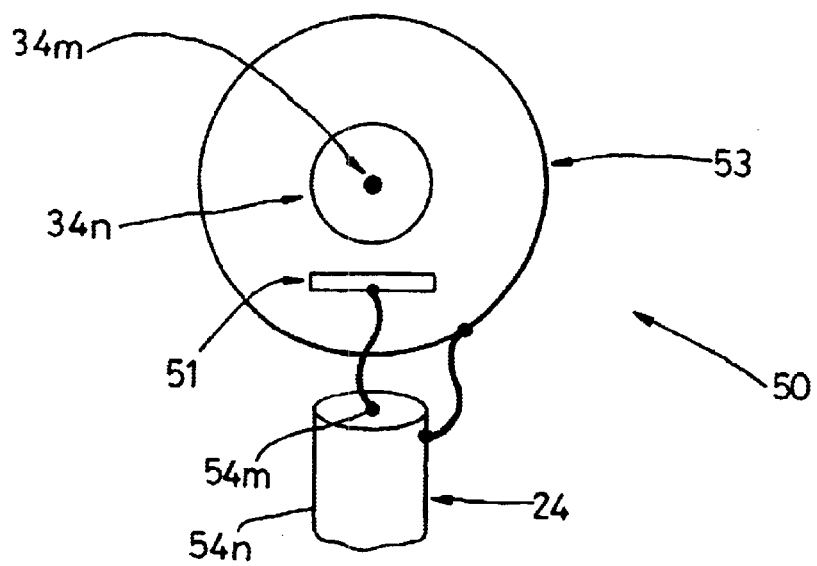

However in a further aspect of the present invention, an improved coaxial cable tap-off point 7 is provided as detailed in FIG. 4. The tap-off point 50 comprises a conductive cylindrical collar 53 or groundplane and a microstrip antenna element 51 positioned such that the coaxial cable 4 is located between the antenna element 51 and the ground plane 53. The length of the microstrip 51 corresponds with two exposed sections of the inner conductor 34m of the coaxial cable 4a, the outer conductor 34m of the coaxial cable 4a having been cut away in two circumferential sections or discontinuities 52a and 52b within the section of coaxial cable 4a encompassed by the cylindrical collar 53. The cylindrical collar 53 is connected at either end to the outer conductor 34n of the coaxial cable 4a forming an electrical connection at the distal ends of the groundplane with the outer conductor 34n. The cylindrical collar or groundplane 53 is also connected to the outer conductor 54n of the coaxial stub 24 to an antenna 5. The microstrip 51 is connected to the inner conductor 54m of the coaxial stub 24 and is also in wireless connection with the inner conductor 34m of the rising coaxial cable 4a. This tap-off point 50 therefore provides a connection between a coaxial stub 24 and the rising coaxial cable 4, without the need for a physical connection to the inner conductor 34m of the rising coaxial cable 4, as required by prior art methods such as the spike arrangement described above and shown in FIGS. 3a and 3b. The tap-off point 50 of FIG. 4 provides for easier assembly and much more flexible mechanical connection tolerances and for this reason is cheaper than prior art methods.

Figure 5A:
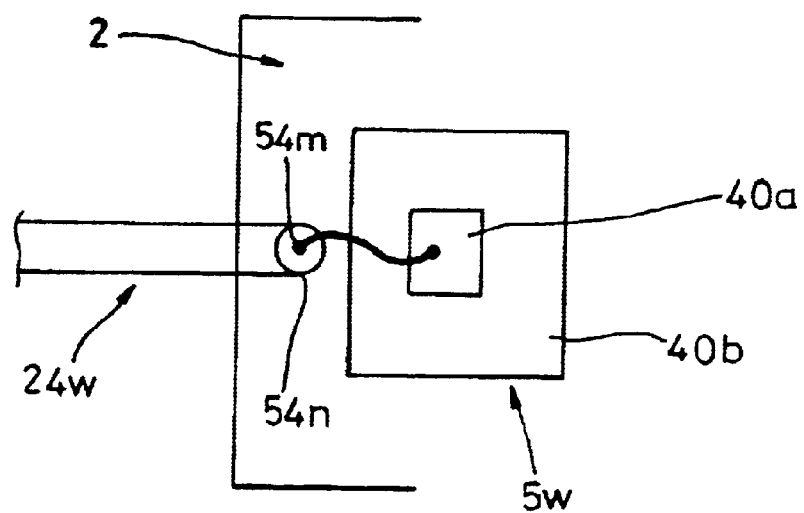
FIG. 5a shows a plan view of a preferred antenna arrangement.
Figure 5B:
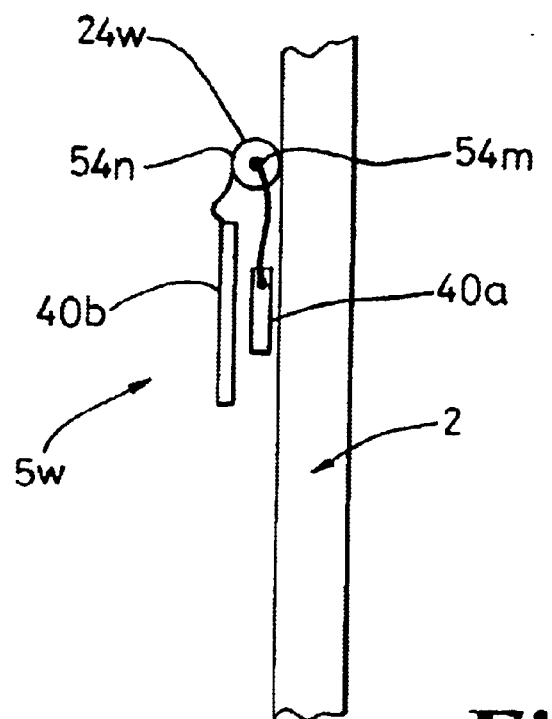

To reduce wireless signal propagation loses between the antennas 5 and subscriber equipment 8 caused by building walls for example, the antenna 5 is preferably mounted onto a window 2. This exploits the low loss signal path through the window 2 and reduces the installation cost. FIGS. 5a and 5b show a preferred antenna arrangement mounted onto a window 2. The antenna is preferably a patch antenna having a radiating patch 40a and a ground plane 40b, the radiating patch 40a being located adjacent the window. The antenna 5 will preferably include a weather proof enclosure (not shown) which is easily applied to the window and easily connected to the coaxial stub 24. Any filtering components 26 associated with the antenna may be incorporated within the antenna enclosure. With the preferred antenna arrangement, baluns are not required given the large ground plane, however these components may be required for different antenna arrangements such as dipole antennas for example, and would normally also form part of the antenna arrangement within the weather proof enclosure. Patch antennas are preferred as they have a relatively narrow bandwidth which is advantageous in the frequency selective tap-off arrangement of the invention.

A coaxial stub 24 is tapped off the rising coaxial cable 4 and run along the outside of the building 1 to the antenna 5 mounted on a window 2, and is connected to the antenna during installation. The installed coaxial cables 4 and 24 can also be utilised to provide other services such as television and video broadcast as well as a telephony service as these services use much lower frequency bands than the frequencies used for the communications system 1.5. Alternatively television and telephony signals can be sent over the data stream provided by the communications system 15.

Figure 6:
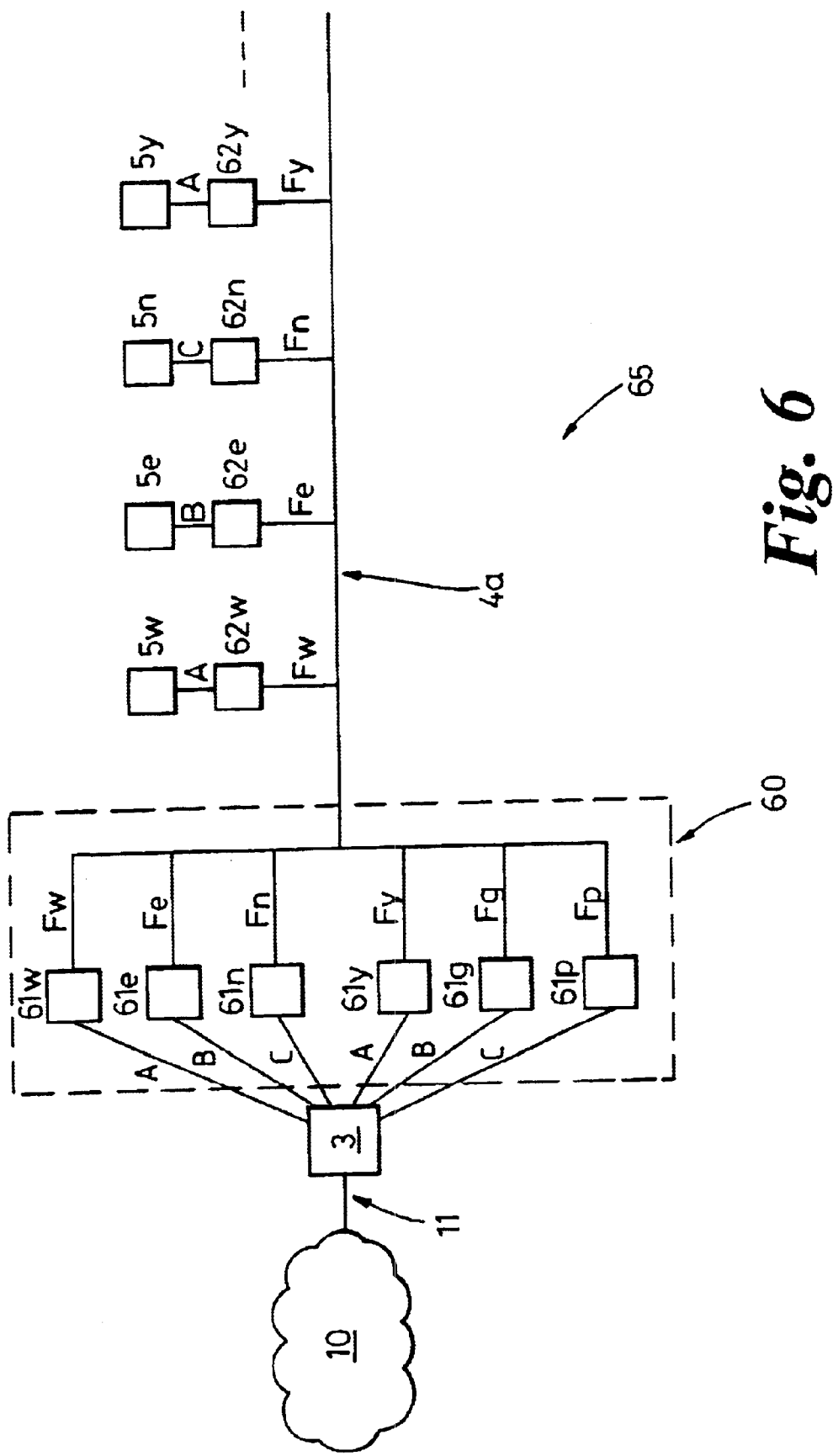
FIG. 6 shows a schematic of an alternative broadband wireless access communications system.

An alternative embodiment broadband wireless access communications system 65 according to the present invention is shown in FIG. 6. The system 65 is broadly similar to that described earlier (15) and comprises a base station 3 connected to a core network 10, and a distribution network 14 preferably comprising coaxial cables 4, each with a number of tapped-off antennas 5, the antennas 5 being allocated one of a number of carrier frequencies in order to reduce co-channel interference. The communications system 65 of FIG. 6 additionally comprises a plurality of up-down frequency converters which act to frequency multiplex signals associated with each antenna 5 onto the distribution network 14 such that each antenna 5 has its own distribution frequency on the distribution network 14. This differs from the communications system 15 of FIG. 1 which uses the three WLAN carrier frequencies available (A, B&C) to distribute signals to the antennas 5, which means that antennas utilising the same carrier frequency must share this carrier frequency on the distribution network 14. The communications system 65 of FIG. 6 does not require the antennas 5 to share a carrier frequency on the coaxial cable 4a, but instead allows the distribution network to utilise the entire bandwidth (for example DC up to 10 GHz) of the coaxial cable 4a by frequency multiplexing the carriers A, B & C. This significantly increases the capacity of the communications system 65 allowing each antenna 5 access to the full bandwidth (11 MHz) of the wireless link 9 between antenna and subscriber equipment 8 irrespective of whether this WLAN carrier frequency is being used by another antenna (for example antennas 5w and 5y which both use carrier frequency A). The previously described frequency plan is still required to provide sufficient spacing between antennas using the same carrier frequency.

Signals transmitted to and received from each antenna unit 5 are allocated a unique distribution frequency F which requires an upon frequency converter 61 at the base station 3 end of the distribution network 14, and a corresponding up-down frequency converter 62 adjacent the antenna 5 to convert between the assigned WLAN carrier frequency A, B, or C and the allocated distribution frequencies F. The base station 3 generates modulated WLAN carrier frequencies A, B, and C, for each antenna 5 of the system 65 which are then passed into a frequency multiplexing unit 60 comprising a number of up-down frequency converters 61. For example, incoming data from the core network 10 addressed to subscriber equipment 8w associated with antenna 5w is mapped onto WLAN carrier frequency A which then passes through up-down frequency 61w which converts the modulated WLAN carrier frequency A for antenna 5w into frequency Fw which may be higher or lower than WLAN carrier frequency A. The up-down frequency converter 62w adjacent the antenna 5w converts signals on frequency Fw back into the modulated WLAN carrier frequency A signal supplied by the base station 3, which is then applied to antenna 5w. The multiplexing unit 60 may be implemented as a PCB card which is incorporated into a PC configured as the base station 3. The modified communications system 65 of FIG. 6 therefore provided a method of increasing the capacity of the system 15 of FIG. 1 at additional cost.

The invention has been described with reference to preferred embodiments thereof. Alterations and modifications as would be obvious to those skilled in the art are intended to be incorporated within the scope hereof.

What is claimed is:

1. A wireless communications system for communicating data between high density subscriber equipment and an external network, the system comprising:
- a base station connectable to said external network;
- a distribution network coupled to the base station;
- and a plurality of antennas coupled to the distribution network, each antenna providing a wireless connection for one or more proximate subscriber equipment to the distribution network;
- wherein said data is communicated between the base station and subscriber equipment by modulating a radio frequency carrier signal, and wherein a common modulated radio frequency carrier signal is used in both the distribution network and over a said wireless connection to communicate said data between a said subscriber equipment and the base station.

2. A system as claimed in claim 1 wherein each said wireless connection is a wireless local area network (WLAN).

3. A system as claimed in claim 2 wherein said data is communicated by modulating multiple radio frequency carrier signals, only one of said signals being used in each WLAN.

4. A system as claimed in claim 3 wherein a said radio frequency carrier signal for a said WLAN is frequency multiplexed onto the distribution network.

5. A system as claimed in claim 3, wherein antennas providing WLANs having common carrier frequencies are spaced apart to minimise co-frequency interference.

6. A system as claimed in claim 5 wherein antennas providing WLANs having common carrier frequencies are physically separated by at least one antenna providing a wireless link having a different carrier frequency.

7. A system as claimed in claim 2 wherein the distribution network is a predetermined radio frequency signal pathway between the base station and the antennas for the modulated radio frequency carrier signal.

8. A system as claimed in claim 7 wherein the signal pathway is a coaxial cable.

* * * * *